United States Patent Office

3,197,435
Patented July 27, 1965

---

3,197,435
COMPOSITION COMPRISING A NOVOLAK AND TRI (LOWER ALKYLIDENE) HEXITOL AND METHOD OF PREPARATION
Thomas E. Ronay, Oak Park, and Robert D. Dexheimer, Naperville, Ill., assignors to The Richardson Company, Melrose Park, Ill., a corporation of Ohio
No Drawing. Filed Nov. 19, 1962, Ser. No. 238,723
5 Claims. (Cl. 260—58)

This invention relates to new and improved resinous materials and to a method for their preparation. Specifically, the invention relates to resinous compositions comprising the polymeric reaction product of a phenolic novolak and a tri (lower alkylidene) hexitol and the preparation of that reaction product.

Resinous materials comprising the reaction product of a tri (lower alkylidene) hexitol and phenol have been developed, the tri (lower alkylidene) hexitol being represented by 1,3:2,4:5,6-trimethylene-D-sorbitol or 1,3:2,4: 5,6-trimethylene-D-mannitol prepared by reacting the corresponding alkyl aldehyde with the selected hexitol as described in J.A.C.S., 65, 2215 (1943). In general, the preparation of those resinous materials from phenol and a tri (lower alkylidene) hexitol has been conducted by acid catalysis with the phenol present in equimolar or higher proportions. Preferably, the ratio has been from about 2 to 1 to 2.3 to 1 of phenol to the tri (lower alkylidene) hexitol, respectively, although ratios of approximately 1 to 1 at the minimum and about 3 to 1 at the maximum are operative. From the foregoing there results, after cure, a resin with good physical properties but with some sensitivity to water, the sensitivity to water, in turn, tending to reduce its strength and dimensional stability.

Accordingly, it is an object of this invention to provide improved resins from tri (lower alkylidene) hexitols, finding applications in such areas as molding compounds, coatings, adhesives and laminates. A further object of the invention is to provide resins from tri (lower alkylidene) hexitols which have little or no sensitivity to water. Additionally, it is an object of the invention to provide resins with short gel times from tri (lower alkylidene) hexitols which can accordingly be easily and economically cured.

These and related objects are achieved by this invention wherein tri (lower alkylidene) hexitols are reacted with novolaks, novolaks being defined for the purposes of this invention as permanently fusible condensation products obtained in an acid medium from reacting, in general, an aldehyde such as formaldehyde with a molar excess of a phenolic compound such as phenol, cresols and xylenols or mixtures thereof.

*Example 1*

188 gm. (2 moles) of C.P. phenol were reacted with 0.73 moles of formaldehyde (24 gm. of paraformaldehyde, 91% formaldehyde) in the presence of 0.165 gm. of sulfuric acid as catalyst. After mixing the materials, they were heated to 95° C. and held at that temperature until all the formaldehyde was reacted (about 30 minutes). The resulting product was a low molecular weight novolak with approximately two benzene nuclei per molecule. To the novolak thus formed was added 159 gm. (0.73 mole) of trimethylene sorbitol and the temperature held at 125° C. for about 30 minutes until a homogeneous mass was obtained. This resinous mass was cooled to prevent further polymerization and at room temperature was semisolid but on slight heating to 60–80° C. was pourable into casting molds. At this stage of polymerization the resin had a Stroke cure time or set time of 60 seconds. Curing at 150–160° C. for 3 hours converted the resin to a hard, tough, infusible, straw-colored solid with the surface exposed to the air tending to be slightly darker. The cured resin exhibited water absorption of 0.001 gm. per square inch, a notched impact (Izod) of 0.40 and a heat distortion temperature above 150° C.

*Example 2*

Following the procedure of Example 1 and using the same amounts of phenol, paraformaldehyde and sulfuric acid catalyst gave the same novolak to which was added 109 gm. (0.5 mole) of trimethylene sorbitol. After 30 minutes at 125° C. polymerization was not sufficient to bring the set time below 360 seconds.

*Example 3*

Again, as in Example 1, with the same amounts of initial reactants a novolak was obtained to which 196 gm. (0.9 mole) of trimethylene sorbitol was added and reacted for 30 minutes at 125° C. to produce a resin with set time of 45 seconds.

The three foregoing examples describe the combination of a single novolak consisting of 2 moles of phenol and 0.73 mole of formaldehyde with varying molar amounts of trimethylene sorbitol, the amounts of the latter being 0.73, 0.5 and 0.9 mole, respectively. Upon adding the tri (lower alkylidene) hexitols to the initially formed or precursor novolaks there is little or no liberation of the alkyl aldehyde as such but there is presumably a chemical combination of that aldehyde moiety with the novolak.

The molar ratio of tri (lower alkylidene hexitol) is therefore significant as it relates to the composition of the precursor novolak. If there is too little total aldehyde equivalent coming from both the original aldehyde source in the precursor novolak and from the tri (lower alkylidene) exitol in the final resin formulation, the novolak will not be converted to a thermosetting resin as would be the case where the mole ratio of aldhehyde to phenol exceeds about 1 to 1. Theoretically, there is an aldehyde equivalent of 3 moles of the aldehyde in each mole of the tri (lower alkylidene) hexitol. In practicing the invention the actual number of moles of aldehyde available per mole of the tri (lower alkylidene) hexitol is probably on the order of 2.5.

An illustration of this can be found in Example 2 where, although 0.73 mole of formaldehyde in the original novolak and 1.5 molar equivalents (based on the theoretical ratio of 3 to 1) in the trimethylene sorbitol would total 2.23 moles exceeding the 2 moles of phenol. Using a 2.5 factor rather than 3, however, to determine the formaldehyde equivalent for the hexitol would give a total formaldehyde equivalent of 1.98 moles, slightly less than the original 2 moles of phenol. On the basis of such calculation a set would be highly problematical and, in fact, no set occurred within a reasonable period of time. However, by the addition of 2 percent by weight of hexamethylenetetramine to the batch to act as a formaldehyde donor, a set time of 40 seconds resulted.

With an increase in proportions of formaldehyde to phenol other novolaks were produced as described in the following and then converted into resole resins within the scope of this invention by reaction with tri (lower alkylidene) hexitols as illustrated in the following examples:

*Example 4*

2820 gm. (30 moles) of phenol and 450 gm. of paraform (equal to 13.7 moles of formaldehyde) were reacted in the presence of 0.95 gm. of sulfuric acid. The paraform was added in 10 to 15 gm. portions during which the heat of reaction raised the temperature to 110° C. Some of the water was stripped off and then the remaining water removed by azeotroping with 250 ml. of toluene, the toluene being finally stripped under vacuum. 600 gm. of this initial novolak, which was homogeneous at room temperature, were then combined with 401 gm. (1.84 moles) of trimethylene sorbitol and an additional 0.55 gm. of sulfuric acid included to produce a total of 0.05 weight percent of sulfuric acid.

*Example 5*

Following the method of Example 4, a novolak was made from 2820 gm. of phenol and 600 gm. of paraform (equal to 18.2 moles of formaldehyde) reacted in the presence of 1.14 gm. of sulfuric acid as catalyst. 800 gm. of this initial novolak were then combined with 134 gm. (0.62 mole) of trimethylene sorbitol during heating at 140° C. for one hour.

As indicated above, the relative amounts of phenol, formaldehyde and formaldehyde equivalents determine the kind of product obtainable. In Example 5 the 800 gm. of initial novolak equal to approximately 7.1 moles of phenol and 4.33 moles of formaldehyde when combined with the 0.62 mole of trimethylene sorbital produces a resinous material with a theoretical 6.19 moles of total formaldehyde equivalent compared with 7.1 moles of phenol—the product being a novolak with a formaldehyde/phenol ratio of 0.87 using the theoretical 3 moles of formaldehyde equivalent per mole of trimethylene sorbitol. By keeping the relative amounts of phenol and formaldehyde the same and increasing the relative amount of trimethylene sorbitol the product is a resole resin as illustrated in the following:

*Example 6*

313 gm. of the initial novolak of Example 5 were combined with 187 gm. (0.86 mole) of trimethylene sorbitol and 0.134 gm. of sulfuric acid added to make a total of 0.05% sulfuric acid. By the time that the exothermic reaction had raised the reaction mass to 140° C., the resin became very viscous and gelled immediately.

The relative proportions in the novolak of each of the phenolic compound and the formaldehyde or formaldehyde donor and the relative proportion of the tri (lower alkylidene) hexitol in the resole are not critical. In general, larger relative amounts of the tri (lower alkylidene) hexitol seem to increase toughness and flexibility in a fully cured product thereby increasing impact resistance.

In the examples relating to the resoles, the novolaks vary as a proportion of the total weight from about 50 to about 70 percent, of which from about 5 to about 10 percent is formaldehyde, with the tri (lower alkylidene) hexitol represented by trimethylene sorbitol varying from about 30 to 50 weight percent. These values only illustrate possible variation, however, and are not limiting in any way. Some further reduction in the percentage of formaldehyde (with attendant increase in the phenol and trimethylene sorbitol percentages) is possible but this will tend to make the resin product more sensitive to water as indicated earlier.

In addition to increasing the relative ratio of tri (lower alkylidene) hexitol to the initial novolak to convert the resinous material to a resole, the initial novolak can be combined with tri (lower alkylidene) hexitol, insufficient in amount to convert it to the resole as was the case in Example 5. The resulting novolaks, however, can be useful as a constituent in molding powders, in which compositions the novolaks are converted to resoles by further reaction with various formaldehyde forms such as paraformaldehyde and trioxane which is a pure polymeric form of formaldehyde, or formaldehyde donors such as hexamethylenetetramine, trishydroxymethyl nitromethane, methylolated ureas and methylolated melamines. Illustrations of this concept can be found in the following:

*Example 7*

819 gm. of the initial novolak of Example 4, which would consist of 7.5 moles of phenol and 3.77 moles of formaldehyde, were reacted with 180 gm. (0.825 mole) of trimethylene sorbitol by cooking at 140° C. for 1 hour to produce a novolak with a theoretical molar ratio of formaldehyde and formaldehyde equivalent to phenol of approximately 0.83.

*Example 8*

Following the procedure of Example 4, 2820 gm. (30 moles) of phenol and 675 gm. of paraform (equal to 20.4 moles of formaldehyde) were combined to produce a novolak in the presence of 1.20 gm. of sulfuric acid. In turn, this novolak (a 903 portion equal to 7.9 moles of phenol and 5.4 moles of formaldehyde) was reacted with 97 gm. (0.44 mole) of trimethylene sorbitol with slight exotherm carrying the temperature to 140° C. for one hour, the product being a novolak with a theoretical formaldehyde to phenol molar ratio of approximately 0.85.

Following are molding powder compositions comprising the tri (lower alkylidene) hexitol-containing novolaks and formaldehyde or a formaldehyde donor:

*Example 9*

| Materials: | Weight percent |
|---|---|
| Product of Example 7 | 41.2 |
| Hexamethylenetetramine | 5.3 |
| Calcium hydroxide | 3.0 |
| Calcium stearate | 0.5 |
| Wood flour | 50.0 |
| | 100.0 |

The product of Example 7 was ground to a 200 mesh particle size in a sigma blade mixer and then blended in the same mixer with the other materials for about 20 minutes. The resulting powder was then placed on a two-roll plastic mill, the temperature of the slow roll being 250° F. and that of the fast roll being 200° F. With the rolls set finger tight the milling was run for 30 seconds beyond the time when the powder began to form a band on the rolls. Izod impact of the molded powder from the milling operation was 0.31 ft. lb./in., flexural strength was 11,800 p.s.i., deflection was 0.072 and heat distortion temperature was 287° F. Absorption of 0.5 N sodium hydroxide solution after immersion for 19 hours at room temperature was 1.9 percent of the original weight of the test cup molded from these materials and 1.23 percent following submersion in water at room temperature for 23 hours.

*Example 10*

| Materials: | Weight percent |
|---|---|
| Product of Example 5 | 40.8 |
| Hexamethylenetetramine | 5.7 |
| Calcium hydroxide | 3.0 |
| Calcium stearate | 0.5 |
| Wood flour | 50.0 |
| | 100.0 |

Processing of the product of Example 5 and combining of this with the other materials was handled in the same manner just described to give a molded material with an Izod value of 0.36 ft. lb./in., a flexural strength of 13,500 p.s.i., deflection of 0.067 and a heat distortion temperature of 278. Caustic absorption was 1.42 weight percent and water absorption at room temperature was 1.04 weight percent.

*Example 11*

| Materials: | Weight percent |
|---|---|
| Product of Example 8 | 40.6 |
| Hexamethylenetetramine | 5.9 |
| Calcium hydroxide | 3.0 |
| Calcium stearate | 0.5 |
| Wood flour | 50.0 |
| | 100.0 |

Following milling as described above in Example 9, there was obtained from the foregoing composition a powder which when molded exhibited an Izod impact strength of 0.35 ft. lb./in., flexural strength of 11,800 p.s.i., deflection of 0.071 and a heat distortion temperature of 295° F. For this molding powder in cup form, caustic absorption was 1.18 weight percent and water absorption was 0.69 weight percent.

The use of Cymel 405, a dimethylol melamine resin, in place of hexamethylenetetramine with the product of Example 7 according to the procedure of Example 9 gave good molding powders somewhat harder to mill than their hexamethylenetetramine-containing equivalents.

As stated in the early portions of the specification, the invention is directed to resins produced from the reaction of a novolak and tri (lower alkylidene) hexitols. Accordingly, although the examples illustrate the tri (lower alkylidene) hexitols by the use of trimethylene sorbitol, it is to be understood that other tri (lower alkylidene) hexitols such as trimethylene mannitol either alone or in combination with trimethylene sorbitol are also specifically within the contemplation of the invention. In practicing the invention by the use of such mixtures which contain even a trace of one such hexitol in the other, it is possible to avoid expensive separation procedures otherwise involved in the preparation of a pure single alkylidene substituted hexitol. Because trimethylene mannitol is relatively nonreactive in relation to trimethylene sorbitol, the degree to which it is present in any mixture will lower reaction rates where amounts of catalyst and heat are not increased.

Having thus described the invention, we claim:

1. A composition of matter comprising the reaction product of a novolak and a tri (lower alkylidene) hexitol from the class consisting of trimethylene sorbitol and trimethylene mannitol.
2. A composition of matter as described in claim 1 wherein the reaction product comprises between 50–70 weight percent of novolak and 30–50 weight percent of the tri (lower alkylidene) hexitol.
3. A composition of matter as described in claim 1 wherein the reaction product has been condensed with a member of the class consisting of formaldehyde and hexamethylene tetraamine.
4. A composition as described in claim 1 wherein said reaction product has been cured to a hard infusible state.
5. A process for producing a resinous composition capable of being cured to a hard infusible state which comprises reacting a novolak with a tri (lower alkylidene) hexitol from the class consisting of trimethylene sorbitol and trimethylene mannitol.

References Cited by the Examiner
UNITED STATES PATENTS
1,892,227   12/32   Voss _____ 260—58

WILLIAM H. SHORT, *Primary Examiner.*